United States Patent
Bae et al.

(10) Patent No.: US 10,613,839 B2
(45) Date of Patent: Apr. 7, 2020

(54) SOURCE CODE DISPLAY DEVICE, SOURCE CODE DISPLAY METHOD, AND COMPUTER READABLE RECORDING MEDIUM HAVING PROGRAM FOR PERFORMING THE SAME

(71) Applicant: SURESOFT TECHNOLOGIES INC., Seoul (KR)

(72) Inventors: Hyun Seop Bae, Seoul (KR); June Kim, Daejeon (KR); Seung-uk Oh, Seoul (KR); Min Hyuk Kwon, Gyeonggi-do (KR)

(73) Assignee: SURESOFT TECHNOLOGIES INC., Seoul (KR)

( * ) Notice: Subject to any disclaimer, the term of this patent is extended or adjusted under 35 U.S.C. 154(b) by 0 days.

(21) Appl. No.: 15/903,443

(22) Filed: Feb. 23, 2018

(65) Prior Publication Data
US 2019/0196792 A1    Jun. 27, 2019

(30) Foreign Application Priority Data
Dec. 27, 2017   (KR) .......................... 10-2017-0181390

(51) Int. Cl.
G06F 9/44        (2018.01)
G06F 8/33        (2018.01)
G06F 8/75        (2018.01)

(52) U.S. Cl.
CPC . *G06F 8/33* (2013.01); *G06F 8/75* (2013.01)

(58) Field of Classification Search
CPC .......... G06F 8/71; G06F 9/44521; G06F 8/30; G06F 8/36; G06F 8/66
See application file for complete search history.

(56) References Cited

U.S. PATENT DOCUMENTS

2012/0254835 A1* 10/2012 Muddu ..................... G06F 8/75
717/121

FOREIGN PATENT DOCUMENTS

KR    10-2008-0094785 A    10/2008

OTHER PUBLICATIONS

Korean Intellectual Property Office, Notice of Reasons for Refusal, KR Patent Application No. 10-2017-0181390, Apr. 22, 2019, seven pages.
Whole Tomato Software, "VA Outline," Jul. 2017, pp. 1-4, [Online] [Retrieved on Apr. 19, 2019] Retrieved from the Internet Archive <URL: https://web.archive.org/web/20170707224643/http://docs.wholetomato.com/default.asp?W187>.

* cited by examiner

*Primary Examiner* — Chuck O Kendall
(74) *Attorney, Agent, or Firm* — Fenwick & West LLP

(57) ABSTRACT

A source code display device includes a visualizer including a screen. A source code is displayed on the screen including a first and second section. An original of a predetermined code unit of the source code is displayed in the first section. At least one code unit other than the predetermined code unit of the source code is displayed in the second section, and each of the at least one code unit is displayed by representative strings of the code unit in the second section. The source code display device may include a memory which stores the source code; an indexer which receives the source code and extracts the representative strings for each code unit of the source code; and an analyzer which determines the predetermined code unit that should be displayed in the first section and determines a ratio of the first section and the second section.

18 Claims, 2 Drawing Sheets

[Fig. 1]

[Fig. 2]
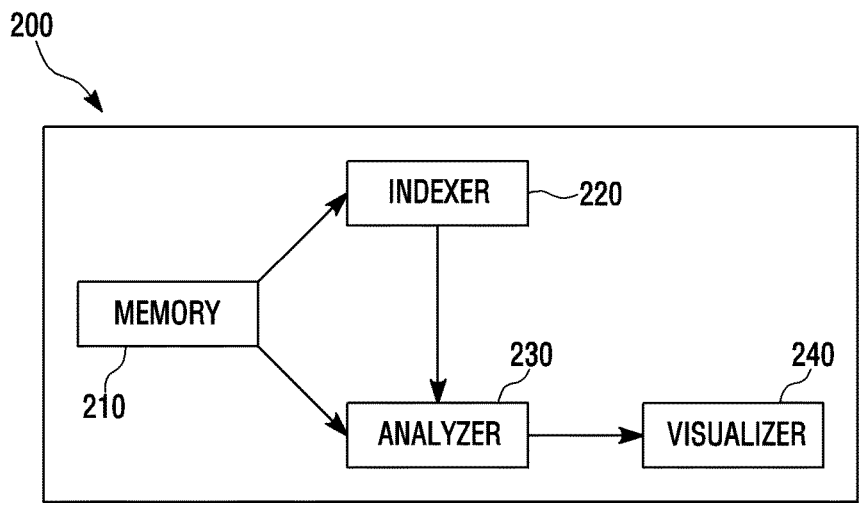
[Fig. 3]
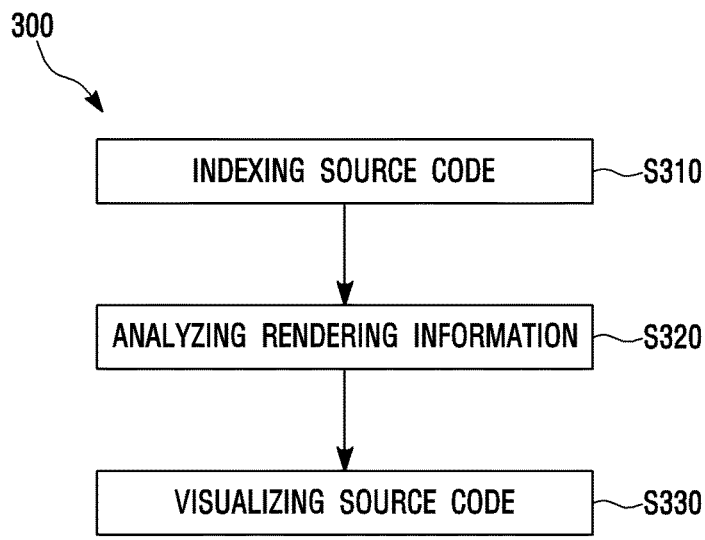

SOURCE CODE DISPLAY DEVICE, SOURCE CODE DISPLAY METHOD, AND COMPUTER READABLE RECORDING MEDIUM HAVING PROGRAM FOR PERFORMING THE SAME

CROSS-REFERENCE TO RELATED APPLICATIONS

This application claims the benefit of Korean Patent Application No. 10-2017-0181390 filed on Dec. 27, 2017, which is hereby incorporated by reference in its entirety.

BACKGROUND

Field

The present disclosure relates to a source code display device, a source code display method, and a computer readable recording medium having a program for performing the same, and more particularly to a source code display device capable of checking the structure of the entire source code and of improving readability in reading and writing the source code, a source code display method, and a computer readable recording medium having a program for performing the same.

Description of the Related Art

In general, a technology for displaying an entire source code is performed by extracting representative strings for each of the code units of the source code and by displaying it on a display device. For example, the representative strings for each of the source code unit may include a function name, a variable name, etc., of a corresponding source code. Another technology for displaying a source code is to simply reduce the code and to display it as a kind of map.

The above-described two methods are provided by a general source code editor. However, when the source code is displayed by the foregoing methods, there is a disadvantage in that it is not possible to edit the source code. That is, a mode for editing the source code and a mode for displaying the source code are separated from each other in the past, so that it is difficult to create an interaction between the editing and/or writing of the source code and the searching and/or viewing of the source code. Therefore, there is a demand for a new technology that enables a user to easily search, edit and/or write the source code.

SUMMARY

One embodiment is a source code display device that includes: a visualizer including a screen. A source code is displayed on the screen including a first section and a second section. An original of a predetermined code unit of the source code is displayed in the first section. At least one code unit other than the predetermined code unit of the source code is displayed in the second section, and each of the at least one code unit is displayed by representative strings of the code unit in the second section.

The source code display device may further include a memory which stores the source code; an indexer which receives the source code from the memory and extracts the representative strings for each code unit of the source code; and an analyzer which determines the predetermined code unit that should be displayed in the first section and determines a ratio of the first section and the second section.

The predetermined code unit may include a point of interest. The point of interest may be a location of a cursor on the screen, a location specified by default, or a location predetermined by a user.

A user may be allowed to write and editing the code for the predetermined code unit displayed in the first section.

The representative strings displayed in the second section may be displayed smaller as a distance from the first section increases.

Another embodiment is a source code display method that includes displaying a source code on a screen including a first section and a second section by a visualizer including the screen. An original of a predetermined code unit of the source code is displayed in the first section. At least one code unit other than the predetermined code unit of the source code is displayed in the second section, and each of the at least one code unit is displayed by representative strings of the code unit in the second section.

The source code display method may further include, before the displaying a source code, a step in which an indexer receives the source code from a memory and extracts the representative strings for each code unit of the source code; and a step in which an analyzer determines the predetermined code unit that should be displayed in the first section and determines a ratio of the first section and the second section.

The predetermined code unit may include a point of interest. The point of interest may be a location of a cursor on the screen, a location specified by default, or a location predetermined by a user.

The second section may be divided into a section before the first section and a section after the first section.

The source code display method may further include writing or editing the code for the predetermined code unit displayed in the first section.

The representative strings displayed in the second section may be displayed smaller as a distance from the first section increases.

Further another embodiment is a computer readable recording medium having a program for performing each of the above-described source code display methods.

BRIEF DESCRIPTION OF THE DRAWINGS

FIG. 1 shows the configuration of a screen displaying a source code in a source code display device according to an embodiment of the present invention;

FIG. 2 is a view showing the configuration of the source code display device according to the embodiment of the present invention; and FIG. 3 is a schematic flowchart of a source code display method according to the embodiment of the present invention.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, exemplary embodiments of the present invention will be described in detail with reference to the accompanying drawings in order that the present invention may be easily implemented by those skilled in the art.

Hereinafter, a source code may comprise of at least one code unit. Here, the code unit may be a unit of a code which may represent one function and/or may be represented by one block. In general, the code may be written/edited or tested according to the code unit.

FIG. 1 shows the configuration of a screen displaying a source code in a source code display device according to an embodiment of the present invention.

FIG. 1 shows that a source code written in C/C++ programming language has been displayed by a display method according to the embodiment of the present invention. It is apparent to those skilled in the art to which the present invention belongs that the display method according to the embodiment of the present invention can be applied to programming languages other than the C/C++ programming language.

Referring to FIG. 1, a screen 100 displaying the source code includes a first section 10 and second sections 20 and 30. In the embodiment, the first section 10 and the second sections 20 and 30 are only divided on the screen 10 and are not necessarily physically divided. A predetermined code unit of the source code is displayed by the original in the first section 10. At least one code unit other than the predetermined code unit of the source code may be displayed in the second sections 20 and 30. Here, the code unit displayed in the second sections 20 and 30 is not displayed by the original and may be compressed and displayed.

The code unit displayed in the first section 10 may include a point of interest. Here, the point of interest may be a location of a cursor on the screen, a location specified by default, or a location predetermined by a user. FIG. 1 shows that a cursor 11 is located in the middle of the code unit displayed in the first section 10. That is, the entire code line of the code unit being written by the user is displayed in the first section 10, thereby enabling the user to edit and/or write the code.

Each of the code units displayed in the second sections 20 and 30 are displayed only by representative strings instead of displaying the entire code line of a corresponding code unit. According to the embodiment, all of the code units located before and after the code unit displayed in the first section 10 may be displayed in the second sections 20 and 30. Accordingly, the user is able to search and retrieve the entire structure of the corresponding source code through the second sections 20 and 30 while editing and/or writing the code unit displayed in the first section 10.

Here, the second sections 20 and 30 may be divided into the second front section 20 and the second rear section 30 with respect to the first section 10. FIG. 1 shows that the second front section 20 is arranged above the first section 10 and the second rear section 30 is arranged below the first section 10. However, according to the embodiment, the second front section 20 may be arranged on left of the first section 10 and the second rear section 30 may be arranged on the right of the first section 10. This arrangement relationship may change according to the embodiment. In the corresponding source code, the second front section 20 may display the code units located before the code unit displayed in the first section 10 and the second rear section 30 may display the code unit located after the code unit displayed in the first section 10.

Also, at least one representative string of the code unit displayed in the second sections 20 and 30 may be displayed smaller as the distance from the point of interest (e.g., the location of the cursor 11) increases. FIG. 1 shows that five code units are displayed in the second front section 20 by representative strings. Here, the representative strings are indicated by reference numerals 21, 22, 23, 24, and 25 respectively. It can be seen that the size of the string becomes smaller as the distance from the first section 10 increases. Likewise, FIG. 1 shows that three code units are displayed in the second rear section 30 by representative strings. Here, the representative strings are indicated by reference numerals 31, 32, and 33 respectively. It can be seen that the size of the string becomes smaller as the distance from the first section 10 increases.

Through the screen configured as such, the readability of the code unit in which tasks such as edition, etc., are performed can be improved and the degree of concentration of the corresponding code unit can increase.

Here, the reduction ratio of the representative strings displayed in the second sections 20 and 30 may be determined by considering visual aesthetic impression and readability. This will be described below in more detail.

FIG. 2 is a view showing the configuration of a source code display device 200 according to the embodiment of the present invention. The source code display device 200 according to the embodiment may include an indexer 220 configured to extract the representative strings according to the code unit of the source code, an analyzer 230 configured to analyze rendering information for displaying the source code on the screen, and a visualizer 240 configured to display the source code on the screen in accordance with the rendering information.

According to the embodiment, the source code display device 200 may further include a memory 210 storing a source code file. The indexer 220 and/or the analyzer 230 may receive the corresponding source code from the memory 210.

In the embodiment, the indexer 220 receives the source code from the memory 210 and extracts the representative strings for each code unit of the source code. The representative strings of the code unit is newly formed by using information on the code unit so as to identify the code unit. This representative string may be determined in advance by the source code display device 200. The indexer 220 may extract the representative string for each code unit by using the information.

In the embodiment, the indexer 220 is configured to classify the code unit as shown in the following table 1 below and to extract the string corresponding to the line of the code unit.

TABLE 1

| Code unit | Representative string |
| --- | --- |
| External unit reference unit | No extraction |
| Variable declaration/Definition unit | Line, Variable name, Type |
| Simple type declaration/Definition unit | Line, Type name |

TABLE 1-continued

| Code unit | Representative string |
|---|---|
| Class type declaration without member method definition | Line, Class name |
| Class type declaration with member method definition | Name through incorporation of type name and name of defined function |
| Function definition | Line, Function name, Function argument |

In the C/C++ programming language, it is not easy to identify and classify the code unit. However, according to the code unit classification method based on the Table 1, the code unit of even the source code written in the C/C++ programming language can be easily classified and identified.

In the embodiment, the indexer 220, for example, may be required to be capable of extracting the representative strings of all of the code units within a few seconds (e.g., one second) in the source code with a size of 10,000 lines.

In the embodiment, the analyzer 230 may analyze the rendering information by receiving the point of interest and the output of the indexer 220. Indexing information extracted from the indexer 220 may be transmitted to the analyzer 230. The information analyzed by the analyzer 230 may allow the visualizer 240 to output the source code on the screen in accordance with set rules.

Here, the point of interest may be, for example, a point where the user desires to directly check the original source code, or alternatively may be a point where the user desires to edit and/or write the code in the source code. Alternatively, the point of interest may be a default point designated forcibly as the point of interest in the source code display device 200. Alternatively, the point of interest may be designated in advance by the user. This point of interest may be one line or code unit of the source code. Alternatively, the point of interest may be the point where the cursor is located within the source code.

The point of interest may be stored in the memory 210. In this case, the point of interest may be input from the memory 210 to the analyzer 230.

The source code display device 200 according to the embodiment of the present invention may further include a controller (not shown). According to the embodiment, the controller may obtain information on the point of interest by a user's setting, a default setting or a user's operation on the source code display device 200. According to the embodiment, the information on the point of interest may be provided to the analyzer 230. The controller may be a processor of the source code display device 200. The controller may control performing of a source code display method according to the embodiment.

For example, when the user positions the cursor in the source code displayed on the screen of the source code display device 200, the performing of the source code display method according to the embodiment of the present invention begins according to the occurrence of the event. When the event that the cursor is positioned at a predetermined position of the source code displayed on the screen occurs, the controller may begin the performing of the source code display method according to the embodiment of the present invention. Accordingly, the controller may transmit the even occurrence to the indexer 220. In addition, the controller may transmit the event occurrence and the event occurrence location (the location of the cursor within the source code) to the analyzer 230. Through the source code transmitted from the memory 210 and the indexing information transmitted from the indexer 220, the analyzer 230 may determine the code unit including the line where the cursor is located in the source code.

The analyzer 230 according to the embodiment of the present invention may determine the code unit that should be displayed in the first section 10 of the screen and determine a ratio of the first section 10 and the second sections 20 and 30. The code unit that should be displayed in the first section 10 may include the point of interest. According to the embodiment, as shown in FIG. 1, the second sections 20 and 30 may include the second front section 20 and the second rear section 30. The analyzer 230 may also determine whether only one or two of the second sections 20 and 30 is included.

According to the embodiment, an example in which the analyzer 230 determines a ratio between the first section 10, the second front section 20, and the second rear section 30 is as follows. The default ratio of the screen displaying the source code may be 20%:60%:20%. Here, the percent of the ratio represent the second front section 20, the first section 10, and the second rear section 30 in the order listed, respectively. This default ratio may be controlled according to the size of the code unit including the point of interest.

When the lines of code (LOC) of the code unit including the point of interest is larger than the maximum LOC that can be displayed on the screen, the ratio is intended to be 5%:90%:5%.

When the LOC of the code unit including the point of interest is the same as the LOC that can be displayed on the screen, the ratio is intended to be 0%:100%:0%.

When there is no other code unit before the code unit including the point of interest, the ratio is intended to be 0%:60%:40%.

When there is no other code unit after the code unit including the point of interest, the ratio is intended to be 40%:60%:0%.

According to the embodiment, the ratio may be changed by the user's setting. Also, according to the embodiment, the ratio may be changed and applied.

The visualizer 240 may display the source code on the screen by using the rendering information received from the analyzer 230. Here, the visualizer 240 may display the source code on the screen in accordance with a predetermined rule. Information on the predetermined rule may be received from the analyzer 230 or may be set in the visualizer 240 by default.

The rule for displaying the source code on the screen may include the following contents.

The representative string displayed in the second front section 20 becomes smaller from a default font size set in the source code display device 200 toward the top. Here, the minimum font may be 4 pt.

The representative string displayed in the second rear section 30 becomes smaller from the default font size set in the source code display device 200 toward the bottom. Here, the minimum font may be 4 pt.

The code displayed in the first section 10 has a size of the default font set in the source code display device 200.

According to the embodiment, the font size of each line displayed in the second sections 20 and 30 may be determined by applying a linear interpolation (expression (1)) between the default font size and the minimum font size.

$$f(x)=(1-a)f(x1)+af(x2) \qquad \text{Expression (1)}$$

Here, f(x) represents the font size of a string x, f(x1) represents the font size of a string x1, and f(x2) represents the font size of a string x2. When it is assumed that a distance between the string x1 and the string x2 is 1, "a" represents a distance between the string x and the string x1.

The expression (1) may be represented by the following code.

```
// Return p that divides p1 and p2 into d1:d2 (here, d1+d2=1)
float lerp (float x1, float x2, float a) {
return (1−a)*x1+a*x2;
}
```

The conversion of the rule into the code according to the embodiment can be made in various ways.

FIG. 3 is a schematic flowchart of the source code display method according to the embodiment of the present invention. Some steps of the source code display method according to the embodiment of the present invention are omitted in FIG. 3. The source code display method according to the embodiment of the present invention may be performed including indexing the source code (S310), analyzing the rendering information (S320), and visualizing the source code (S330).

The visualizing the source code (S330) includes a step in which the visualizer including the screen displays the source code on the screen including the first section and the second sections thereon. The original of a predetermined code unit of the source code may be displayed in the first section 10, and at least one code unit other than the predetermined code unit of the source code may be displayed in the second sections. In the second sections, each of the at least one code unit may be displayed by representative strings of the code unit.

The indexing the source code (S310) and the analyzing the rendering information (S320) may be performed before the visualizing the source code (S330). The indexing the source code (S310) may include a step in which the indexer 220 receives the source code from the memory 210 and extracts the representative strings for each code unit of the source code. The analyzing the rendering information (S320) may include a step in which the analyzer 230 determines the predetermined code unit that should be displayed in the first section and determines a ratio of the first section and the second sections.

Here, the predetermined code unit may include the point of interest, and the point of interest may be a location of a cursor on the screen, a location specified by default, or a location predetermined by the user.

According to the embodiment, the second sections 20 and 30 may be divided into the section before the first section 10 and the section after the first section 10.

According to the embodiment, writing or editing the code for the predetermined code unit displayed in the first section 10 may be further included.

According to the embodiment, the representative strings displayed in the second sections 20 and 30 may be displayed smaller as the distance from the first section 10 increases.

The source code display method according to the embodiments shown in FIGS. 1 to 3 may be performed by a non-transitory computer readable recording medium including a computer readable recording medium having program instructions for performing computer-implemented operations. The computer readable recording medium may include the program instruction, data file, data structure, etc., individually or in a combination thereof. For example, the computer readable recording medium may include functional modules performing respective steps shown in FIG. 3. Specifically, the computer readable recording medium may include a code indexing module for performing code indexing, an analyzing module for analyzing the rendering information, and/or a visualizing module for displaying the source code on the screen. Also, according to the embodiment, the computer readable recording medium may include additional module.

The non-transitory computer readable recording medium may be specially designed and configured for the embodiment or may be well-known and available to those skilled in the field of computer software. The example of the non-transitory computer readable recording medium includes a magnetic medium such as a hard disk, a floppy disk, and a magnetic tape, an optical recording medium such as a CD-ROM and DVD, a magneto-optical medium such as a floptical disk, and a hardware device which is specially configured to store and execute program instructions such as ROM, RAM, flash memory, etc. The example of the program instruction includes an advanced language code which can be executed by using an interpreter, etc., by a computer as well as a machine language code which is created by a compiler.

Through use of the source code display method according to the embodiment of the present invention, unnecessary code contexts are removed and codes currently being written/edited are concentrated. Therefore, code readability of the user editing the code can be improved.

In addition, through use of the source code display method according to the embodiment of the present invention, the user can check the code contents of a predetermined code unit line by line and can also search/retrieve/check the entire structure of the source code by briefly displaying the remaining code units by representative strings.

While the embodiment of the present invention has been described with reference to the accompanying drawings, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A source code display device comprising a screen and a visualizer,
wherein the visualizer displays a source code on the screen comprising a first section and a second section,
wherein the visualizer displays an original of a predetermined code unit of the source code in the first section, and displays at least one code unit other than the predetermined code unit of the source code in the second section, and displays each of the at least one code unit by representative strings of the code unit in the second section,
wherein the representative strings displayed in the second section are displayed smaller as a distance from the first section increases.

2. The source code display device of claim 1, further comprising:
a memory which stores the source code;
an indexer which receives the source code from the memory and extracts the representative strings for each code unit of the source code; and an analyzer which determines the predetermined code unit that should be displayed in the first section and determines a ratio of the first section and the second section.

3. The source code display device of claim 2, wherein the predetermined code unit comprises a point of interest,
and wherein the point of interest is a location of a cursor on the screen, a location specified by default, or a location predetermined by a user.

4. The source code display device of claim 1, wherein the second section is divided into a section before the first section and a section after the first section.

5. The source code display device of claim 2, wherein the second section is divided into a section before the first section and a section after the first section.

6. The source code display device of claim 3, wherein the second section is divided into a section before the first section and a section after the first section.

7. The source code display device of claim 1, wherein a user is allowed to write and editing the code for the predetermined code unit displayed in the first section.

8. The source code display device of claim 2, wherein a user is allowed to write and editing the code for the predetermined code unit displayed in the first section.

9. The source code display device of claim 1, wherein the representative strings displayed in the second section is displayed smaller as a distance from the first section increases.

10. The source code display device of claim 3, wherein the representative strings displayed in the second section is displayed smaller as a distance from the first section increases.

11. A source code display method comprising displaying a source code on a screen included in a source code display device, the method comprising:
    displaying the source code on the screen comprising a first section and a second section by a visualizer, wherein the visualizer displays an original of a predetermined code unit of the source code in the first section, and displays at least one code unit other than the predetermined code unit of the source code in the second section, and displays each of the at least one code unit by representative strings of the code unit in the second section,
    wherein the representative strings displayed in the second section are displayed smaller as a distance from the first section increases.

12. The source code display method of claim 11, further comprising, before the displaying a source code:
    a step in which an indexer receives the source code from a memory and extracts the representative strings for each code unit of the source code; and
    a step in which an analyzer determines the predetermined code unit that should be displayed in the first section and determines a ratio of the first section and the second section.

13. The source code display method of claim 12, wherein the predetermined code unit comprises a point of interest,
and wherein the point of interest is a location of a cursor on the screen, a location specified by default, or a location predetermined by a user.

14. The source code display method of claim 11, wherein the second section is divided into a section before the first section and a section after the first section.

15. The source code display method of claim 11, further comprising writing or editing the code for the predetermined code unit displayed in the first section.

16. A computer readable recording medium having a program for performing the source code display method of claim 11.

17. A computer readable recording medium having a program for performing the source code display method of claim 12.

18. A computer readable recording medium having a program for performing the source code display method of claim 13.

* * * * *